April 15, 1930.  G. DEN BESTEN  1,754,412
SAFETY HITCH
Filed April 30, 1928   2 Sheets-Sheet 2
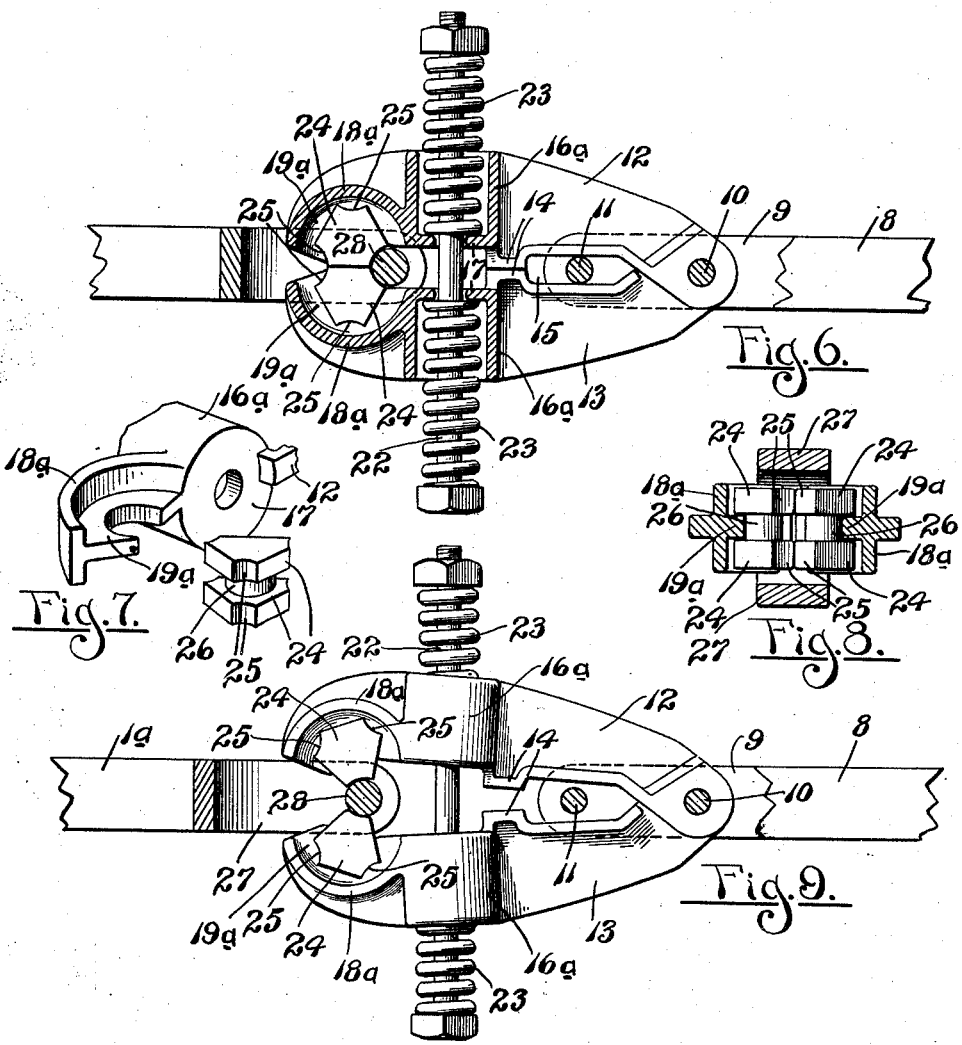
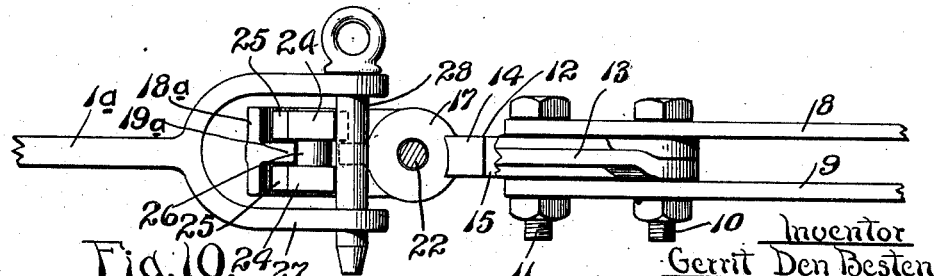
Inventor
Gerrit Den Besten Patented Apr. 15, 1930

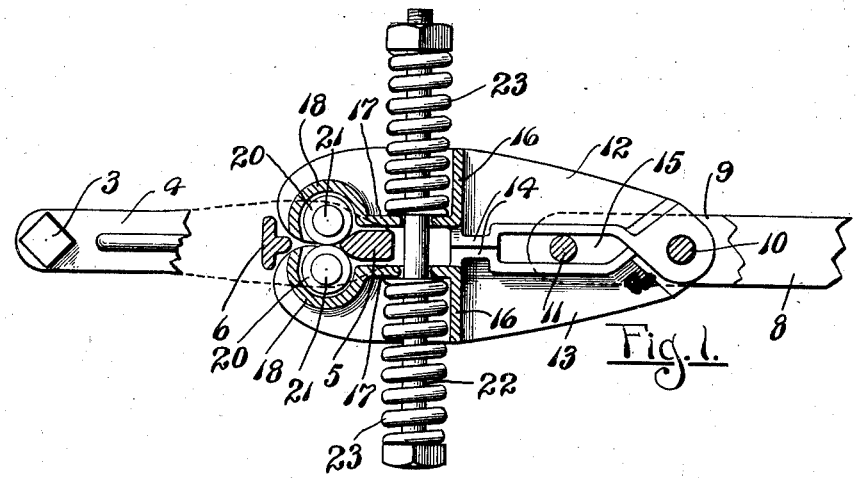
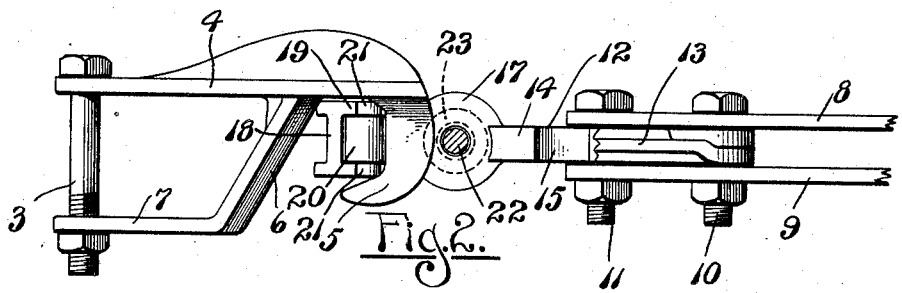
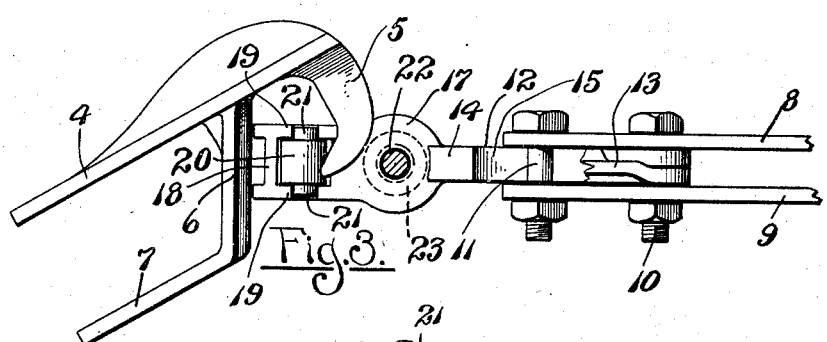
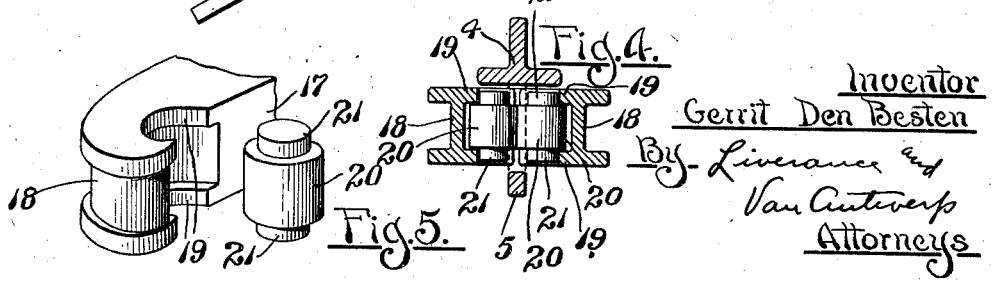
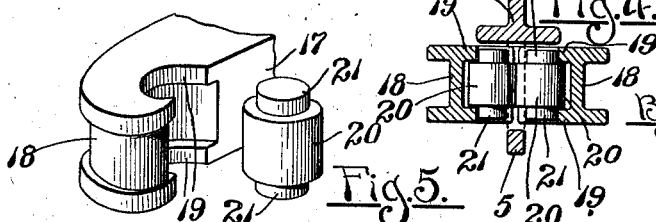

1,754,412

UNITED STATES PATENT OFFICE

GERRIT DEN BESTEN, OF HOLLAND, MICHIGAN

SAFETY HITCH

Application filed April 30, 1928. Serial No. 273,808.

This invention relates to a safety hitch designed to be used with tractors when the same are utilized for drawing heavy implements such as plows or the like, and which is adapted to automatically separate and thus disconnect the tractor from said implement should an extra heavy strain be encountered. For instance in plowing, many times the plow striking a more or less solid obstruction, the hitch will automatically operate to disconnect the plow and tractor before any parts of either are broken, or before, as many times has occured without safety devices of this character, the tractor rises and turns over backward.

My invention is concerned with a very simple yet practical and efficient hitch of this character, sure in its operation and one which can be manufactured and sold at a very low cost, there being little or no machine work needed on the metal parts which are used in making the hitch.

An understanding of the invention and the structure embodying the same may be had from the following description taken in connection with the accompanying drawings, in which, Fig. 1 is a plan view of the hitch, certain parts thereof being broken away and shown in section for better disclosure of the structure.

Fig. 2 is a side elevation thereof, one jaw of the hitch being broken away.

Fig. 3 is a view similar to Fig. 2 showing the manner in which a hook cooperating with the hitch may be connected with or detached from the same.

Fig. 4 is a vertical transverse section through the hitch at the point where the gripping rollers are mounted.

Fig. 5 is a fragmentary perspective view showing one of said rollers and the end of the jaw in which it is mounted.

Fig. 6 is a view similar to Fig. 1 illustrating a slightly different form of the hitch construction.

Fig. 7 is a perspective view, similar to Fig. 5, illustrating the equivalent of the gripping rollers used and the end of a jaw member in which the same are individually mounted.

Fig. 8 is a transverse vertical section, similar in all respects to that shown in Fig. 4, but illustrating the different construction of hitch.

Fig. 9 is a plan view of the hitch shown in Fig. 6, showing the manner in which the jaws are opened to disconnect the same upon encountering a force greater than the parts should withstand, and, Fig. 10 is an elevation with one jaw member broken away, showing the different form of the invention, the elevation in Fig. 10 corresponding to that shown in Fig. 2.

Like reference characters refer to like parts in the different figures of the drawings.

In the construction illustrated the bolt 3 is used in conjunction with a hook member which in turn is designed to be connected with the hitch carried by and extending forwardly from the implement drawn, the bolt passing through an evener, the hook member and bolt being used when horses are used to draw the implements.

The hook member has an upper member 5 which extends back and at its rear end terminates in a hook 5, the edge of the hook 5 being thinned and tapered, as shown in Fig. 1. A short distance from the edge of the hook 5 a bar 6 extends diagonally downward for a distance and is then extended horizontally, as at 7, parallel to the upper bar 4. The bolt 3 passes through openings adjacent the ends of said bars 4 and 7.

The hitch includes upper and lower draw bars 8 and 9 which extend to the rear and are attached at any suitable place to the tractor. Two bolts 10 and 11 pass through the bars 8 and 9, the latter being located close to the ends of said bars, while the bolt 10 is located a short distance back thereof. Two jaw members 12 and 13 at their rear ends overlap and are pivotally mounted on and between the bars 8 and 9, the bolt 10 passing through said overlapping ends. Each of the jaw members at a point intermediate its ends and at its inner side is formed with an inwardly extending shoulder 14. Said shoulders are designed to have abutting contact in front of which is an open elongated space or slot 15 through which the bolt 11 passes. The two jaw members 12 and 13 accordingly are centered and held in alignment with said bolt 11.

Forward of the shoulders 14 the jaw members carry webs 16, 17 and 18 from which upper and lower flanges extend outwardly. The webs 17 are parallel to each other while the webs 18 are of substantially semi-cylindrical form and are located adjacent the rear ends of the jaws 12 and 13. Flanges 19 extend inwardly from the upper and lower edges of webs 18 in which curved recesses are made in order that rollers 20 having bearing studs 21 at each end may be received within and mounted in said recesses, the studs 21 entering the bearing recesses in the webs 19, while the rollers 20 are housed within the curved web portions 18.

An elongated bolt 22 passes through the webs 17. Between the head of the bolt and one of the webs 17 a strong coiled compression spring 23 is placed and between the opposite web and a nut threaded on to the end of the bolt another and like spring 23 is located. These springs under compression serve to force the jaw members of the hitch toward each other until the shoulders 14 come into abutting engagement. In such position the two rollers 20 bear against each other.

The hook 5 is placed back of the rollers 20 with its tapered edge entering between the rollers. So long as the pulling force from the tractor to the implement connected with it does not exceed a predetermined safe amount the rollers will remain together and a secure connection of the implement to the tractor will be had. But if the strain exceeds the predetermined safe amount the springs 23 are compressed and the jaws separate whereupon the hook 5 passes between the rollers 20 and a disconnection of the tractor and the implement drawn thereby is had.

It is, of course, evident that a reconnection of the hook 5 with the device may be readily had. The design of the hook and its position with respect to the diagonal portion 6 is such that while the hook may be connected with the hitch readily it can be connected only in an angular position, like that shown in Fig. 3, which necessitates a removal of the bolt 3. Conversely the hook member will not disconnect from the hitch after it has been connected therewith and is in the substantially horizontal position shown in Fig. 2, in which position it is maintained after the bolt 3 has been passed through the eye 2.

In Figs. 6 to 10 inclusive a slightly different form of hitch is shown. The draw bars 8 and 9 and the way that the jaws 12 and 13 are mounted thereon is the same as that previously described. The webs 16ª are of cylindrical form and the two ends 17 thereof are parallel to each other, while beyond the ends 17 are semi-circular webs 18ª between the upper and lower edges of which flanges 19ª extend inwardly, each having a curved socket formed therein, as best shown in Fig. 7. Members equivalent to the rollers 20 may be mounted therein, each of said members consisting of upper and lower triangular shaped heads 24, each corner of which is cut away and formed with a rounded recess 25. The two heads 24 of each member are integrally connected by a cylindrical stud 26 received within the recess of a web 19ª. The spring means for forcing the jaws together is the same and when the jaws are in their normal position two flat sides of the heads on said members are in abutting engagement, as shown in Fig. 6.

The bar 1 which is connected to a tractor for drawing an implement at its rear end is formed with a substantially U-shaped clevis having upper and lower parallel legs 27 through which a bolt 28 passes, the bolt lying back of the heads 24 and being received in recesses 25 on both of said heads, as shown in Fig. 6.

When the strain exceeds a predetermined safe amount the jaws separate with a compression of the springs 23 and the heads 24 rotate, the bolt 28 staying in the recesses 25 in which it has been seated and following said recesses as the heads rotate. This is illustrated in Fig. 9 which shows the manner in which the hitch may be disconnected from said bolt 28. It is identical in principle of operation with the structure first described, and which is shown in Figs. 1 to 5 inclusive.

The hitch described is of simple and economical construction, as is evident. The parts are simply formed, easily fabricated and are substantially complete when cast requiring little or no machine work other than properly finishing some of the holes or openings through which the bolts, such as 10, pass. The construction has proved very practical in service. The appended claims define the invention and is to be considered comprehensive of all forms of structure coming within their scope.

I claim:

1. A hitch construction comprising a draw bar, two jaw members pivotally connected to said draw bar and extending beyond one end thereof, spring means acting on said jaw members to force the same together, and rotary members mounted at the inner sides of and adjacent the free ends of the jaw members and normally held in contact with each other by said spring means, a connected draft member being adapted to bear against said rotary members at the inner sides thereof.

2. A hitch comprising, two jaw members pivotally connected at one end and lying alongside of each other, a draw bar construction to which the jaw members are connected at their pivotally mounted ends, strong spring means normally holding the jaws together, each of said jaw members adjacent its free end having a concaved housing at its inner side, and a vertical rotary member mounted for rotation in each housing, said rotary members normally having contact engagement.

3. A hitch of the character described comprising, a draw bar construction, jaw members pivotally connected at one end to said draw bar construction and extending therefrom alongside of each other, shoulders intermediate the ends and at the inner sides of the jaw members normally bearing against each other, there being an open space between said shoulders and the pivot of the jaw members, a bolt passing through the draw bar construction and through said open space between the jaw members, heavy spring means acting on the jaw members at their outer sides to force the same toward each other, and rotary members mounted to turn about vertical axes carried one by each jaw member at its inner side and adjacent its free end, said rotary members normally bearing against each other.

4. In a hitch, upper and lower parallel draw bars, two spaced apart bolts passing through said bars, jaw members having one end of each lying between the bars and one of said bolts passing through the ends of the jaw members, projecting shoulders at the inner sides of the jaw members beyond the ends of the draw bars normally bearing against each other, there being an open space between the inner sides of the jaw members between said shoulders and the point of pivotal connection to the bar, the other bolt passing between the jaw members at said open space, a rod having heads at its outer ends extending transversely through the jaw members, heavy coiled compression springs between the heads of the rod and the outer sides of said jaw members, and a member mounted for rotation about a vertical axis carried at the inner side and adjacent the outer end of each jaw member, said rotary members normally bearing against each other.

5. A construction containing the elements in combination defined in claim 5, each of said rotary members being of substantially triangular shape with the corners thereof cut away to form concave recesses, adjacent sides of the rotary members contacting with each other and with two adjacent recesses on said members joining to form a substantially semi-circular depression between said members where they are in contact with each other.

6. A hitch comprising, two jaw members pivotally connected together and lying alongside of each other, spring means normally holding the jaws together, and a rotatable member mounted on the movable end of each jaw, each of said rotatable members being of substantially triangular shape and adjacent sides of the triangles contacting each other by pressure of said spring means.

7. A hitch comprising, two jaw members pivotally connected together and lying alongside of each other, spring means normally holding the jaws together, and a rotatable member mounted on the movable end of each jaw, each of said rotatable members being of substantially triangular shape and adjacent sides of the triangles contacting each other by pressure of said spring means and the corners of said triangles being cut away to form joining surfaces engageable by a draft member.

In testimony whereof I affix my signature.
GERRIT DEN BESTEN.